(12) United States Patent
Ashrafi

(10) Patent No.: US 10,784,569 B2
(45) Date of Patent: Sep. 22, 2020

(54) ELECTROMAGNETIC KNOT APPLICATIONS IN RADIO WAVES FOR WIRELESS AND PHOTONICS FOR QUANTUM COMPUTING

(71) Applicant: NxGen Partners IP, LLC, Dallas, TX (US)

(72) Inventor: Solyman Ashrafi, Plano, TX (US)

(73) Assignee: NXGEN PARTNERS IP, LLC, Dallas, TX (US)

( * ) Notice: Subject to any disclaimer, the term of this patent is extended or adjusted under 35 U.S.C. 154(b) by 0 days.

(21) Appl. No.: 16/579,298

(22) Filed: Sep. 23, 2019

(65) Prior Publication Data

US 2020/0119435 A1    Apr. 16, 2020

Related U.S. Application Data

(60) Provisional application No. 62/744,516, filed on Oct. 11, 2018.

(51) Int. Cl.
| | | |
|---|---|---|
| *H04B 7/00* | (2006.01) | |
| *H01Q 1/36* | (2006.01) | |
| *H01Q 11/08* | (2006.01) | |
| *H01Q 7/00* | (2006.01) | |
| *G06N 10/00* | (2019.01) | |

(52) U.S. Cl.
CPC ............. *H01Q 1/36* (2013.01); *H01Q 7/00* (2013.01); *H01Q 11/08* (2013.01); *G06N 10/00* (2019.01)

(58) Field of Classification Search
CPC . H01Q 1/36; H01Q 7/00; H01Q 11/08; H01Q 1/125; H01Q 5/45; H01Q 19/132; H01Q 19/17; H01Q 25/007; G06N 10/00; G08B 13/2494; G06F 1/1616; G06F 1/1626; G06F 1/1698; G01N 2223/101; G01N 23/284
See application file for complete search history.

(56) References Cited

U.S. PATENT DOCUMENTS

| | | | | |
|---|---|---|---|---|
| 8,432,884 | B1 * | 4/2013 | Ashrafi | H04L 5/04 370/343 |
| 9,077,577 | B1 * | 7/2015 | Ashrafi | H04B 10/2581 |
| 2002/0191565 | A1 * | 12/2002 | Mani | H04B 10/25755 370/334 |
| 2010/0080309 | A1 * | 4/2010 | Moffatt | H04L 27/2613 375/260 |

(Continued)

OTHER PUBLICATIONS

Torus-Knotted Electromagnetic Fields, Arraya et al., Mar. 2012, pp. 1-15.*

(Continued)

*Primary Examiner* — Stephen M D Agosta

(57) ABSTRACT

A system for transmitting signals includes processing circuitry for receiving at least one input signal for transmission from the processing circuitry to a second location. Electromagnetic knot processing circuitry receives processed signals from the first processing circuitry and applies an electromagnetic knot to the received processed signal before transmission to the second location. A first signal degradation caused by environmental factors of the electromagnetic knot processed signal is improved over a second signal degradation caused by the environmental factors of a non-electromagnetic knot processed signal.

31 Claims, 11 Drawing Sheets

(56) References Cited

U.S. PATENT DOCUMENTS

| | | | | |
|---|---|---|---|---|
| 2012/0319903 A1* | 12/2012 | Huseth | ............... | G01S 3/74 342/386 |
| 2013/0235744 A1* | 9/2013 | Chen | ............... | H04L 47/82 370/252 |
| 2015/0071190 A1* | 3/2015 | Lau | ............... | H04B 7/0417 370/329 |
| 2016/0028479 A1* | 1/2016 | Ren | ............... | H04B 10/1121 398/43 |
| 2016/0043794 A1* | 2/2016 | Ashrafi | ............... | H04B 7/0697 370/329 |
| 2017/0223735 A1* | 8/2017 | Damnjanovic | ............... | H04W 74/08 |

OTHER PUBLICATIONS

Two properties of electromagnetic knots, Ranada et al. Jul. 1997, pp. 25-33.*

Knots and electromagnetism, De Klerk, Jun. 2016, pp. 1-44.*

Electromagnetic Knots, Ranada et al., Jul. 1995, pp. 337-342.*

Electromagnetic Knots and the Magnetic Flux in superconductors, Jose Trueba, 2008, pp. 183-192.*

Knots and the Maxwell's Equations, Vancea, Jan. 2019, pp. 1-25.*

Arrayas, M., Trueba, J. L.; Exchange of helicity in a knotted electromagnetic field; Annalen der Physik, Wiley Online Library, vol. 524, No. 2; 71-75, (2012).

Ranada, A. F.; A Topological Theory of the Electromagnetic Field; Letters in Mathematical Physics, vol. 18, No. 2; 97-106, (1989).

Thomson, W. (1868). VI.—On Vortex Motion. Transactions of the Royal Society of Edinburgh, 25(1), 217-260.

Dirac, P. A. M. (1931). Quantised singularities in the electromagnetic field. Proceedings of the Royal Society of London. Series A, Containing Papers of a Mathematical and Physical Character, 133(821), 60-72.

Aiaronov, Y., & Boimi, D. (1959). Significance of electromagnetic potentials in the quantum theory. vol. 115, No. 3, 485-491.

Arrayas, M., & Trueba, J. L. (2011). Torus-Knotted Electromagnetic Fields. arXiv preprint arXiv:1106.1122.

Ranada, A. F., & Trueba, J. L. (1998). A topological mechanism of discretization for the electric charge. Physics Letters B, 422(1-4), 1-10.

* cited by examiner

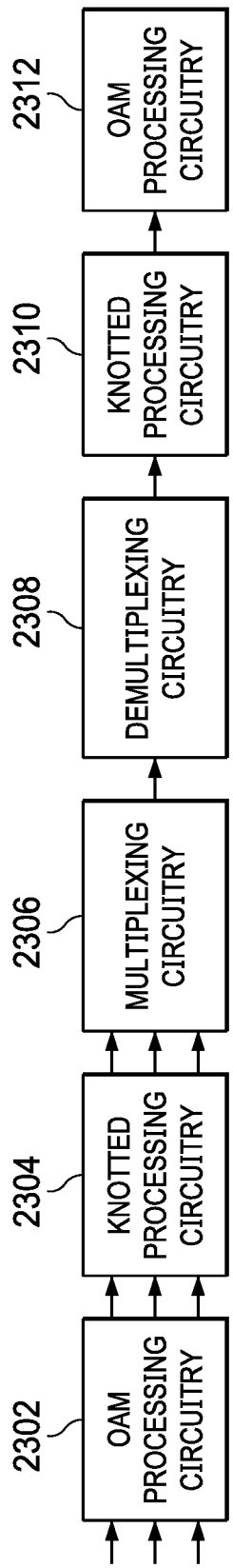
FIG. 23
FIG. 25
FIG. 24

ELECTROMAGNETIC KNOT APPLICATIONS IN RADIO WAVES FOR WIRELESS AND PHOTONICS FOR QUANTUM COMPUTING

CROSS-REFERENCE TO RELATED APPLICATIONS

This application claims the benefit of U.S. Patent Application Ser. No. 62/744,516, filed Oct. 11, 2018, entitled ELECTROMAGNETIC KNOTS AND ITS APPLICATIONS IN RADIO WAVES FOR WIRELESS AND PHOTONICS FOR QUANTUM COMPUTING, which is incorporated by reference herein in its entirety.

TECHNICAL FIELD

The present invention relates to the transmission signals in wireless communication systems and quantum computers, and more particularly to a manner for improving signal degradation in wireless communications systems and quantum computers using electromagnetic knots.

BACKGROUND

The transmission of wireless signals in the optical and RF environment and the transmission of quantum signals within a quantum computing environment is susceptible to various environmental interferences and degradations. These environmental interferences and degradations can harm signal quality and cause problems with signal interpretation and discernment. Some manner for limiting signal degradations in these operating environments would provide a great deal of improvement in the signal transmissions and quantum computing environments.

SUMMARY

The present invention, as disclosed and described herein, in one aspect thereof comprises a system for transmitting signals includes processing circuitry for receiving at least one input signal for transmission from the processing circuitry to a second location. Electromagnetic knot processing circuitry receives processed signals from the processing circuitry and applies an electromagnetic knot to the received processed signal before transmission to the second location. A first signal degradation caused by environmental factors of the electromagnetic knot processed signal is improved over a second signal degradation caused by the environmental factors of a non-electromagnetic knot processed signal.

BRIEF DESCRIPTION OF THE DRAWINGS

For a more complete understanding, reference is now made to the following description taken in conjunction with the accompanying Drawings in which:

FIG. 23 illustrates a system for multiplexing and demultiplexing OAM knotted signals;

FIG. 24 illustrates a circuit for multiplexing OAM knotted beams with other radio channels; and FIG. 25 illustrates knot division multiplexing circuitry.

DETAILED DESCRIPTION

Figure 1:
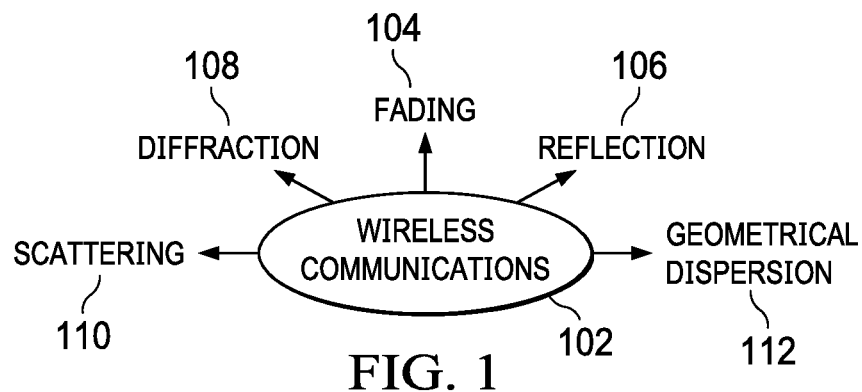
FIG. 1 illustrates various problems associated with wireless communications that may be address by electromagnetic knots.

Referring now to the drawings, wherein like reference numbers are used herein to designate like elements throughout, the various views and embodiments of electromagnetic knot applications in radio waves for wireless transmissions and photonics for quantum computing are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

An exact solution of Maxwell's equations in empty space with non-trivial topology of the force lines has been obtained by Arrayas and Trueba as described in M. Arrayas and J. L. Trueba, Ann. Phys. (Berlin) 524, 71-75 (2012), which is incorporated herein by reference in its entirety, in which there is an exchange of helicity between the electric and magnetic fields. The two helicities are different at time zero, but in the limit of infinite time they are equal, their sum being conserved. Although not widely known, there are topological solutions of Maxwell equations with the surprising property that any pair of electric lines and any pair of magnetic lines are linked except for a zero measure set. These solutions called "electromagnetic knots", discovered and described in A. F. Rañada, Lett. Math. Phys. 18, 97 (1989); A. F. Rañada, J. Phys. A: Math. Gen. 23, L815 (1990); A. F. Rañada, J. Phys. A: Math. Gen. 25, 1621 (1992), which are each incorporated herein by reference in their entirety and building on the Hopf fibration as describe in H. Hopf, Math. Ann. 104, 637 (1931), which is incorporated herein by reference in its entirety allows for the basis for a topological model of electro-magnetism (TME) to be proposed, in which the force lines play a prominent role. In A. F. Rañada and J. L. Trueba, Modern Nonlinear Optics, Part III. Electromagnetism, Vol. 119, edited by I. Prigogine and S. A. Rice (John Wiley and Sons, New York, 2001) pp. 197-253 and A. F. Rañada, Phys. Lett. A 310, 134 (2003), each of which are incorporated herein by reference in their entirety, a review is presented of the work done on the topological model of electro-magnetism. The paper by Arrayas and Trueba is an important step in its development.

The principal aim of this line of research is to complete the topological model of electro-magnetism that, in its present form, is locally equivalent to Maxwell's theory, is based on the topology of the electric and magnetic lines and has topological constants of motion as the electric charge or the total helicity. The force lines are the level curves of two complex scalar fields $\phi(r, t)$, $\theta(r, t)$ with only one value at infinity, that can be interpreted as maps between two spheres $S^3 \bullet \to S^2$, the compactification of the physical 3-space and the complete complex plane. As shown by Hopf, such maps can be classified in homotopy classes. W. T. M. Irvine and D. Bouwmeester, Nature Phys. 4, 716 (2008), which is incorporated herein by reference, describes some exciting mathematical representations of these knots, analyzes their physical properties and considers how they can be experimentally constructed.

Faraday dedicated many hours to thinking about the idea of force lines. In his view they had to be important since the experiments showed that a sort of unknown perturbations of space occurred along them. In fact, during the 19th century many physicists tried to understand the electromagnetic phenomena in terms of the vorticity and the streamlines of the ether. Then in 1869, Kelvin wrote a paper entitled "On vortex atoms" (Lord Kelvin, Trans. R. Soc. Edin-burgh 25, 217 (1869), which is incorporated herein by reference) suggesting that the atoms could be links or knots of the vacuum vorticity lines, an idea praised by Maxwell in his explanation of the term "atomism" in the *Encyclopaedia Britannica* in 1875. Kelvin disliked the extended idea that the atoms are infinitely hard and rigid objects, which he qualified as "the monstrous assumption." He was much impressed by the constancy of the strength of the vorticity tubes in a non-viscous fluid that Helmholtz had investigated. For him, this was an unalterable quality on which the atomic theory could be based without the need for infinitely rigid objects. We know today that this is also a property of topological models in which invariant numbers characterize configurations that can deform, warp or distort. About sixty years later, topology appeared in Dirac's significant proposal of the monopole (P. A. M. Dirac, Proc. R. Soc. Lond. A 133, 60 (1931), which is incorporated herein by reference) and later in the Aharonov-Bohm effect (Y. Aharonov and D. Bohm, Phys., Rev. 115, 485 (1959), which is incorporated herein by reference) which show that, in order to describe electromagnetic phenomena, topology is needed. The same idea motivated the insightful statement attributed to Atiyah "Both topology and quantum physics go from the continuous to the discrete" as described in M. Atiyah, The Geometry and Physics of Knots (Cambridge University Press, Cambridge, 1990), which is incorporated herein by reference.

In the topological model of electro-magnetism, the Faraday 2-form and its dual are equal to the pull-backs of the area 2-form in $S^2$, say $\sigma$, by the two maps, i.e.

$$\mathcal{F} = \tfrac{1}{2} F_{\mu\nu} dx^\mu dx^\nu = -\phi^* \sigma, * \mathcal{F} = \tfrac{1}{2} *F_{\mu\nu} dx^\mu dx^\nu = \theta^* \sigma$$

Where * is the Hodge or duality operator, the two scalars verifying the condition $*\phi^*\sigma = -\theta^*\sigma$. It is curious that if this condition is fulfilled, then the forms $\mathcal{F}$ and $*\mathcal{F}$ verify automatically Maxwell's equations. In that case, each solution is characterized by the corresponding Hopf index n. The previous relations allow the expressions of the magnetic field B(r, t) and electric field E (r, t) to be written in terms of the scalars as:

$$B(r, t) = \frac{\sqrt{a}}{2\pi i} \frac{\nabla \phi \times \nabla \bar{\phi}}{(1 + \bar{\phi}\phi)^2}$$

$$E(r, t) = \frac{\sqrt{ac}}{2\pi i} \frac{\nabla \bar{\theta} \times \nabla \theta}{(1 + \bar{\theta}\theta)^2}$$

where a bar over a variable means a complex conjugate, i is the imaginary unit, c is the speed of light and a is a constant introduced so that the magnetic and electric fields have the correct dimensions. In SI units a is a pure number times $\hbar \mu_0$, where $\hbar$ is the Planck constant, c the light speed and $\mu_0$ the vacuum permeability. The pure number is taken here to be 1, the simplest choice.

Some thought-provoking properties of the topological model of electro-magnetism are the following. It is locally equivalent to the standard Maxwell's theory in the sense that any electromagnetic knot coincides locally with a radiation field, i.e. satisfying E·B=0. However the two models are not globally equivalent because of the way in which the knots behave around the point at infinity. As a consequence of the Darboux theorem as described in C. Godbillon, Géometrie différentielle et mécanique analytique (Hermann, Paris, 1969), which is incorporated herein by reference, any electromagnetic field is locally equal to the sum of two radiation fields.

Maxwell's equations are equal to the exact linearization by change of variables (not by truncation) $\phi, \theta \to E, B$ of the set of nonlinear equations of motion of the scalars $\phi, \theta$. These equations can be easily found, using the standard Lagrangian density of the electromagnetic field expressed in terms of the pair $\phi, \theta$. It happens, however, that this change of variables is not completely invertible, which introduces a "hidden nonlinearity" that explains why the linearity of the standard Maxwell equations is compatible with the existence of topological constants in the topological model of electromagnetism.

The electromagnetic helicity $\mathcal{H}$ is defined as:

$$\mathcal{H} = \tfrac{1}{2} \int_{R_3} (A \cdot B + C \cdot E/c^2) d^3 r,$$

where A and C are vector potentials for B and E, respectively as described in F. W. Hehl and Y. N. Obukhov, Foundations of Classical Electrodynamics: Charge, Flux and Metric (Birkhäuser, Boston, 2003), which is incorporated herein by reference. This quantity is conserved and topologically quantized. Solving the integral, it is found that $\mathcal{H} = na$, where n is the common value of the Hopf indices of $\phi$ and $\theta$. It turns out, moreover, that $\mathcal{H} = (N_R - N_L)$ where $N_R$, $N_L$ are the classical expressions of the number of right- and left-handed photons contained in the field (i.e. $\mathcal{H} = \int d^3 k [\bar{a}_R(K) a_{(k)}(k) - \bar{a}_L(k) a_L(k)]$, $a_R(k) a_L(k)$, being Fourier transforms of $A_\mu$ in classical theory but creation and annihilation operators in the quantum version). This establishes the curious relation n=NR−NL between two concepts of helicity, i.e. the rotation of pairs of lines around one another (n, classical) and the difference between the number of right- and left-handed photons (NR−NL, quantum), respectively. In the standard knots of the topological model of electromagnetism, the two terms of the helicity integral are equal. What Arrayás and Trueba have done suggests that these standard knots are attractors of other knots that have unequal electric and magnetic helicities, which is a curious and interesting result as illustrated in M. Arrayás and J. L. Trueba, arXiv:1106.1122v1 [hep-th] (2011), which is incorporated herein by reference.

Another intriguing property of the topological model of electro-magnetism is that the electric charge is also topologically quantized (as well as the hypothetical magnetic charge), the fundamental charge that it predicts being $q_0 = \hbar c c_0 = 5.29 \times 10^{-19} C \approx 3.3$ e, while its fundamental monopole would be $g_0 = q_0/c = g_D/20.75$, $g_D$ being the value of the Dirac monopole as described in A. F. Rañada and J. L. Trueba, Phys. Lett. B 422, 196 (1998), which is incorporated herein by reference. This means that the topological model of electro-magnetism is symmetric under the interchange of electricity and magnetism. Note, however, that $e < q_0 < g_D c$, which raises an exciting, if perhaps speculative, eventuality. Because the vacuum is dielectric but also paramagnetic, its effect must be to decrease the value of the charge and to increase that of the monopole. This suggests the possibility that the topological model of electro-magnetism could describe what happens at high energies, at the unification scale, where the particles interact directly through their fundamental bare charge $q_0$ without renormalization. This suggestion is reinforced by the fact that the fine structure constant of the model is:

$$a0 = q_0^2/4\pi \hbar c \varepsilon_0 = 1/4\pi \approx 0.8, \text{ a value 0 close to a strong}$$

Application to Wireless Communications and Quantum Computing

Figure 2:
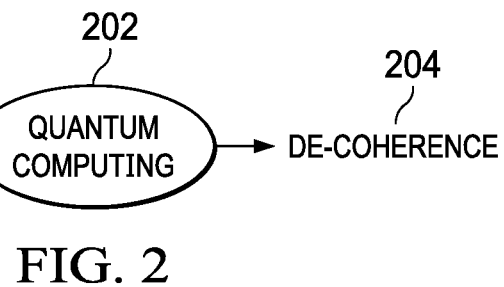
FIG. 2 illustrates problems associated with quantum computing that may be addressed by electromagnetic knots.

Referring now to FIGS. 1 and 2, there are illustrated the various problems associated with wireless communications and quantum computing that may be address by electromagnetic knots. In wireless communications 102 and quantum computing 202, there are natural processes that degrade the signal. In the case of wireless communications 102 this degradation is introduced by fading 104, reflection 106, diffraction 108, scattering 110 as well as geometrical dispersion 112. The fading 104 is mostly due to reflections, refractions and scattering environment which could take the form of slow fading or fast fading. The geometrical dispersion 112 is a function of distance and as the electromagnetic wave propagates longer distances, the energy and power are reduced. In case of quantum computing 202, superposition of states to produce qubits can be destroyed due to de-coherence 204. Natural processes destroy coherence in quantum computing superposition of states for qubits.

Figure 3:
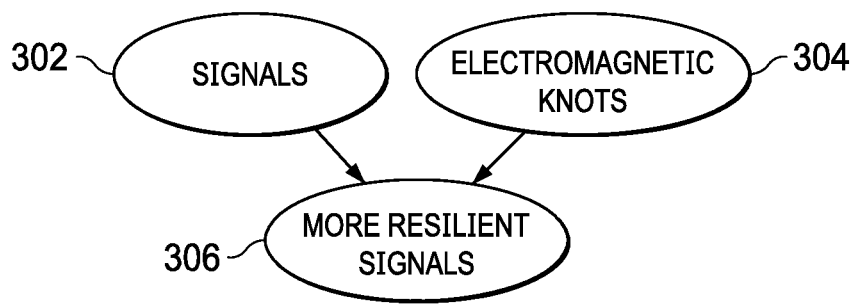
FIG. 3 illustrates the combination of generated signals with electromagnetic knot processing for generating more resilient signals.

This system and method introduces a new way of combating the degradations due to fading and geometrical dispersion in wireless communications as well as quantum de-coherence in quantum computing using electromagnetic knots. As illustrated in FIG. 3 by combining existing signals 302 with some type of electromagnetic knot processing 304, a more resilient signal 306 is provided that is not as susceptible to the issues described above is provided. Wireless signal degradations cannot easily open an electromagnetic knot and such electromagnetic knots are resistant to channel impairments. Quantum signals having an electromagnetic knot applied thereto cannot easily be opened and are resistant to de-coherence. The generation of electromagnetic knots 304 is more fully described herein below.

In general, natural processes can degrade fabrics and signals, but generally they are not able to undue a knotted fabric or a knotted electromagnetic wave. Today, we know that Maxwell equations have an underlying topological structure given by a scalar field which represents a map S3×R→S2 that determines the electromagnetic field through a certain transformation from 3-sphere to 2-sphere. Therefore, Maxwell equations in vacuum have topological solutions, characterized by a Hopf index equal to the linking number of any pair of magnetic lines. This allows the classification of the electromagnetic fields into homotopy classes, labeled by the value of the helicity. This helicity verifies ∫A·B dr=na where "n" is an integer and an action constant. This helicity is proportional to the integer action constant.

Topology will plays a very important role in field theory. Since 1931, when Dirac proposed his idea of the monopole, topological models have a growing place in physics. There have been many applications such as the sine-Gordon equation, the Hooft-Polyakov monopole, the Skyrme and Faddeev models, the Aharonov-Bohm effect, Berry's phase, or Chern-Simons terms.

As more fully described hereinbelow, a model is introduced of an electromagnetic field in which the magnetic helicity ∫A·B dr is a topological constant of the motion, which allows the classification of the possible fields into homotopy classes, as it is equal to the linking number of any pair of magnetic lines.

Electromagnetic Field Model with Hopf Index

Let $\phi(r,t)$ and $\theta(r,t)$ be two complex scalar fields representing maps $R^3 \times R \to C$. By identifying $R^3 \cap \{\infty\}$ with $S^3$ and $C \cap \{\infty\}$ with $S^2$, via stereographic projection, $\phi$ and $0$ can be understood as maps $S^3 \times R \to S^2$. We then define the antisymmetric tensors $F_{uv}$, $G_{uv}$ to be equal to:

$$F_{uv} = \int_{uv} (\phi) = \frac{\sqrt{a}}{2\pi i} \frac{\partial_u \phi^* \partial_u \phi - \partial_u \phi^* \partial_u \phi}{(1 + \phi^* \phi)^2}$$

$$G_{uv} = f_{uv}(\theta) = \frac{\sqrt{a}}{2\pi i} \frac{\partial_u \theta^* \partial_u \theta - \partial_u \theta^* \partial_u \theta}{(1 + \theta^* \theta)^2}$$

where a is an action constant, introduced so that $F_{uv}$, and $G_{uv}$, will have proper dimensions for electromagnetic fields, and prescribe that G be the dual of F or, equivalently, $$G_{uv} = \tfrac{1}{2}\epsilon_{uv\alpha\beta} F^{\alpha\beta} F_{uv} = -\tfrac{1}{2}\epsilon_{uv\alpha\beta} G^{\alpha\beta}$$

where $\epsilon^{0123} = +1$. To fulfill this requirement, $\phi$ is a scalar and $\theta$ a pseudo scalar. This allows defining of the magnetic and electric fields B and E as:

$$F_{0i} = E_i, \ F_{y} = -\epsilon_{yk} B_k; \ G_{oi} = B_1, \ G_{y} = -\epsilon_{ijk} E_k;$$

After that, the Lagrangian density is determined:

$$L = -\tfrac{1}{8}(F_{uv}F^{uv} + G_{uv}G^{uv}),$$

The duality condition or constraint is then imposed:

$$M_{\alpha\beta} = G_{x\beta} - \tfrac{1}{2}\epsilon_{x\beta uv} F^{uv} = 0$$

Following the method of Lagrange multipliers, the modified Lagrangian density are determined according to:

$$L' = L + \mu^{\alpha\beta} M_{\alpha\beta},$$

where the multipliers are the component of the constant tensor $\mu^{\gamma\beta}$. A simple calculation shows that the constraint above does not contribute to the Euler-Lagrange equations, which happen to be:

$$\partial_\alpha F^{\alpha\beta} \partial_\beta \phi = 0 \quad \partial_\alpha F^{\alpha\beta} \partial_\beta \phi^* = 0$$

$$\partial_\alpha G^{\alpha\beta} \partial_\beta \theta = 0 \quad \partial_\alpha G^{\alpha\beta} \partial_\beta \theta^* = 0$$

This means that, if the Cauchy data ($\phi$, $\partial_0\phi$, $\theta$, $\partial_0\theta$) at t=0 verify the constraint, it will be maintained for all t>0. Surprisingly, it follows that both $F_{\alpha\beta}$ and $\partial_{\alpha\beta}$ verify Maxwell equations in vacuum. In fact, definitions above imply that:

$$\epsilon^{\alpha\beta\gamma\delta}\partial_\beta F_{\gamma\delta} \epsilon^{\alpha\beta\gamma\delta}\partial_\beta G_{\gamma\delta} = 0, \beta=0,1,2,3$$

which is the second Maxwell pair for the two tensors. In other words, $\phi$ and $\theta$ obey the Euler-Lagrange equations), then $F_{\alpha\beta}$ and $G_{\alpha\beta}$ defined by verify the Maxwell ones and are, therefore, electromagnetic fields of the standard theory. The reason is that Maxwell equations in vacuum have the property that, if two dual tensors verify the first pair, they also verify the second one (i.e. the two pairs are dual to each other).

A standard electromagnetic field is any solution of Maxwell equations. An admissible electromagnetic field is one which can be deduced from a scalar $\phi$. Let $f_{uv}(\phi)$ be the electromagnetic tensor $F_{uv}$. The electric and magnetic vectors of $\phi$, $E(\phi)$ and $B(\phi)$ respectively, are:

$$E_1(\phi) = f_{01}(\phi), B_1(\phi) = \frac{1}{2}\epsilon_{ijk}f_{jk}(\phi)$$

With this notation, the duality constraint is written as:

$$E(\phi) = -B(\theta), B(\phi) = E(\theta)$$

It is necessary to characterize the Cauchy data $\{\phi(r, 0), \partial_t\phi(r,0), \theta(r,0),\partial_t\theta(r,0)\}$. As was shown before, if the condition is verified at t=0, and is also satisfied for all t>0. In this case, the Cauchy data and the corresponding solution of Maxwell equations are admissible.

From the two facts
i) $E(\phi)$ and $B(\phi)$ are mutually orthogonal
ii) $B(\phi)$ is tangent to the curves $\phi$=canst and $B(\phi)$ is tangent to $\theta$=canst, It follows that these two sets of curves must be orthogonal. Let $\phi(r, 0)$ be any complex function with the only condition that the 1-forms $d\phi$ and $d\phi^*$ in $R^3$ are linearly independent. The previous condition on $\phi$ can be written as:

$$(\nabla\phi^* \times \nabla\phi) \cdot (\nabla\theta^* \times \nabla\theta) = 0$$

Given $\phi$, is a complex PDE for the complex function $\theta$; it has solutions (this will be used in an explicit example herein below). This gives $\phi(r, 0)$ and $\theta(r, 0)$, and the time derivatives $\partial_t\phi(r, 0)$ and $\partial_t\theta(r, 0)$ are fixed by the condition above. For instance, $B(\theta)$ is a linear combination of $\nabla\phi^*$ and $\nabla\phi$:

$$B(\theta) = h\nabla\phi^* + b^*\nabla\phi$$

The function $\phi(r, 0)$ can be determined from $\phi(r, 0)$ and $\theta(r, 0)$ and, $$E\phi = \frac{1}{2\pi i} = \frac{\partial_0\phi^*\nabla\phi - \partial_0\phi\nabla\phi^*}{(1+\theta^*\theta)^2} = -B(\theta)$$

The value of $\partial_0\phi$ can be computed. To obtain $\partial_o\theta$, one can proceed in an analogous way. Therefore, there is no difficulty with the Cauchy problem, the system having two degrees of freedom with a differential constraint.

Up to now, a pair of fields ($\phi$, $\theta$) have been used, but it is easy to understand that $\theta$ is no more than a convenience which can be disregarded. In fact, one can forget about $\theta$ and use only the scalar $\phi$, taking:

$$L = -\frac{1}{4}F_{uv}f^{uv}, F_{uv} = f_{uv}(\phi)$$

As Lagrangian density and accepting only Cauchy data [$\phi(r, 0), \partial_0\phi(r,0)$] for which there exists an auxiliary function $\theta$. From this point of view, the electromagnetic field would be a scalar. From now on, the $\theta$ field will be considered only as an auxiliary function. The basic field equations of the model thus take the form:

$$\partial^u F_{uv} = \sqrt{a} \, \partial^u \left[ \frac{1}{2\pi i} \frac{\partial_u\phi^*\partial_y\phi - \partial_y\phi^*\partial_u\phi}{(1+\phi^*(\phi)^2)} \right]$$

and are transformed into Maxwell equations.
In summary:
(1) In a theory of the fields $\phi$ and $\theta$ based on the Lagrangian with the constraint, the tensors $F_{\alpha\beta}$ and $G_{\alpha\beta}$ defined previously obey Maxwell equations. This means that the standard electromagnetic theory can be derived from an underlying structure.
(2) The formulas can be understood as defining a transformation:

$$T: \phi \to F_{uv} = F_{uv}(\phi), \theta \to G_{uv} = f_{uv}(\theta)$$

which transforms the highly nonlinear Euler-Lagrange equations into Maxwell equations.
(3) The transformation T is not invertible, because there are solutions of Maxwell equations $H_{uv}$ such that $T^{-1}$ ($H_{uv}$) is not defined, that is to say, that a scalar field $\phi$ such that $H_{uv} = f_{uv}(\phi)$ does not exist.

These solutions of Maxwell equations are not included in this theory. Also, the use of the spheres $S^3$ and $S^2$ may remind us of Chern-Simons terms. But, as $S^3$ represents the physical space $R^3$ via stereographic projection and $S^2$ identified with the complex plane, is the space where the field takes values, this model does not really make use of these kinds of terms.

As will be shown in the next section, it is not possible to distinguish between this model and the Maxwell one if the fields are weak. However, every $\phi$ solution defines at any time t a map $S^3 \to S^2$ which has a topological charge. In this fashion, the electric E and magnetic B fields can be represented as follows:

$$B = \mathbb{R}\left[ \frac{1}{c} \int_0^{2\omega} \int_0^\pi \int_0^\infty (\hat{\varphi}\tilde{A} - \hat{\partial}\tilde{B}) e^{i(k\hat{k}\cdot r - \omega t)} k^2 d\sin\vartheta d\vartheta d\varphi \right]$$

$$\hat{\varphi} = -\hat{x}\sin\varphi + \hat{y}\cos\varphi$$

$$\hat{\partial} = \hat{x}\cos\varphi\cos\vartheta + \hat{y}\sin\varphi\cos\vartheta - +\hat{z}\sin\vartheta$$

$$\hat{k} = \hat{x}\cos\varphi\cos\vartheta + \hat{y}\sin\varphi\cos\vartheta - +\hat{z}\sin\vartheta$$

$$E = \mathbb{R}\left[ \frac{E_0}{2\pi} \int_0^{2\pi} \int_0^\pi (\hat{\partial}\tilde{B}' \hat{\partial}\tilde{A}') e^{ik_0 \hat{k}\cdot r} \sin\vartheta d\vartheta d\varphi e^{-i\omega_0 t} \right]$$

$$B = \mathbb{R}\left[ \frac{E_0}{2\pi} \int_0^{2\pi} \int_0^\pi (\hat{\partial}\tilde{A}' - \hat{\partial}\tilde{B}') e^{ik_0 \hat{k}\cdot r} \sin\vartheta d\vartheta \varphi e^{-i\omega_0 t} \right]$$

$$'\tilde{a} = -2i\sqrt{\pi^3\epsilon_0} (\hat{\varphi}\tilde{A}' - \hat{\partial}\tilde{B}') e^{-i\omega_0 t} / \sqrt{\hbar\omega}'$$

$$f' = \int_0^\pi J_1(k_0\sin\partial n_p s)\cos(k_0\cos\partial n_p z)\sin\partial d\vartheta$$

$$\tilde{E}_0' \frac{\mu_0\omega_0 \tilde{I} M e^{ik_0 n_p R}}{2\pi}$$

-continued $$f' = \int_0^\pi J_1(k_0\sin\vartheta n_p s)\cos(k_0\cos\vartheta n_p z)\sin\vartheta d\vartheta$$

$$E^{LF} \approx |\tilde{E}'_0|\hat{\phi}f'\cos(\omega_0 t - arg\tilde{E}'_0)$$

It is possible to create paraxial solutions using electromagnetic knots that produce knotted Orthogonal Orbital Angular (OAM) states. These states can be muxed to achieve improvements in wireless, security, Quantum Key Distribution and quantum computing.

How to Generate Electromagnetic Knots

Figure 4:
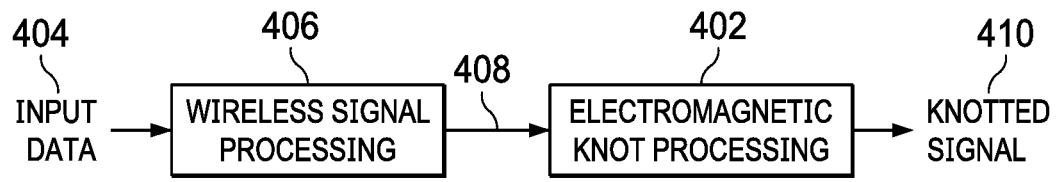
FIG. 4 illustrates a wireless signal transmission system having electromagnetic knot processing applied thereto.
Figure 5:
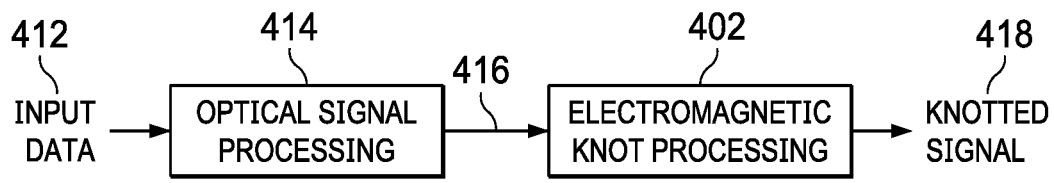
FIG. 5 illustrates an optical signal transmission system having electromagnetic knot processing applied thereto.
Figure 6:
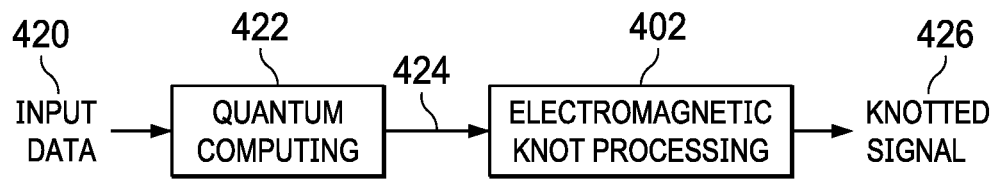
FIG. 6 illustrates a quantum computing system having electromagnetic processing applied thereto.

Referring now to FIGS. 4-6, there are illustrated various implementation of electromagnetic knot processing circuitry 402 that may be associated with other types of circuitry to improve signal degradation in their associated systems. FIG. 4 illustrates a wireless signal transmission wherein input data 404 is first applied to wireless signal processing circuitry 406 that uses RF signal modulation techniques for modulating the input data 404 on to an RF signal for transmission. The RF modulated signals 408 from the wireless signal processing circuitry 406 are applied to the electromagnetic knot processing circuitry 402 as will be more fully described hereinbelow. The electromagnetic knot processing circuitry 402 applies electromagnetic knots to the RF modulated signal 408 that provides an output electromagnetic knotted signal 410. As described previously, the knotted signals 410 within the wireless signal transmission system will be less susceptible to fading and geometrical dispersion due to the application of the electromagnetic knots to the signals for transmission.

FIG. 5 illustrates an optical signal transmission system wherein input data 412 is first applied to optical signal processing circuitry 414 that uses optical signal modulation techniques for modulating the input data 412 on to an optical signal for transmission. The optically modulated signals 416 from the optical signal processing circuitry 414 are applied to the electromagnetic knot processing circuitry 402 as will be more fully described hereinbelow. The electromagnetic knot processing circuitry 402 applies electromagnetic knots to the optically modulated signal 416 that provides an output electromagnetic knotted signal 416. As described previously, the knotted signals 418 within the optical signal transmission system will be less susceptible to fading and geometrical dispersion due to the application of the electromagnetic knots to the signals for transmission.

FIG. 6 illustrates a quantum computing system wherein input data 420 is first applied to quantum computing processing circuitry 422 that uses quantum computing techniques for application to the input data 420 within the processing circuitry 422. The quantum computing signals 424 from the quantum computing processing circuitry 422 which may be optical or RF are applied to the electromagnetic knot processing circuitry 402. The electromagnetic knot processing circuitry 402 applies electromagnetic knots to the quantum signals 408 that provides an output electromagnetic knotted signal 410. As described previously, the knotted signals 424 within the quantum computing system will be less susceptible to de-coherence due to the application of the electromagnetic knots to the signals for transmission.

Figure 7:
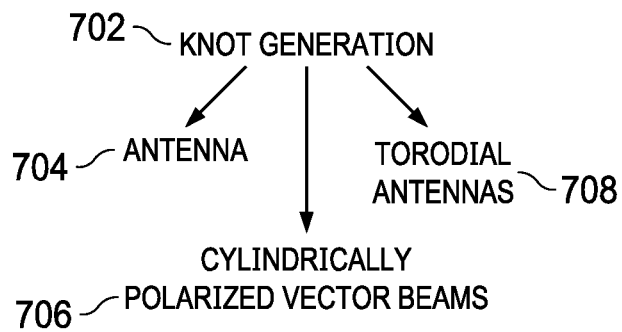
FIG. 7 illustrates various methods for electromagnetic knot generation.

Referring now to FIG. 7, different methods of electromagnetic knot generation 402 will be required depending upon the form of disturbance required and the frequencies required. These forms can take the form of ring, toroidal and 3-D patch antennas in some examples. An antenna 404 can be used to generate an electric ring in the radio wave (i.e. microwaves) implementations. Cylindrically polarized vector beams 706 may be used to generate an electric ring. Toroidal antennas 708 may also be used to create electromagnetic knots. The electromagnetic waves can be knotted using sophisticated antenna structures such as ring antennas, toroidal antennas and 3-D patch antennas. Information may then be encoded into the electromagnetic knots as the states (modulated knots).

Electromagnetic Radio Wave Knots

Figure 8:
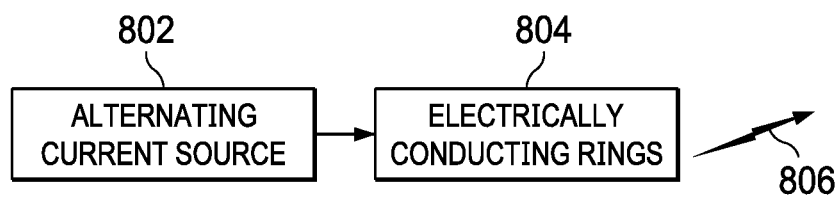
FIG. 8 illustrates a general block diagram of the manner for generating electromagnetic radio wave knots.
Figure 9:
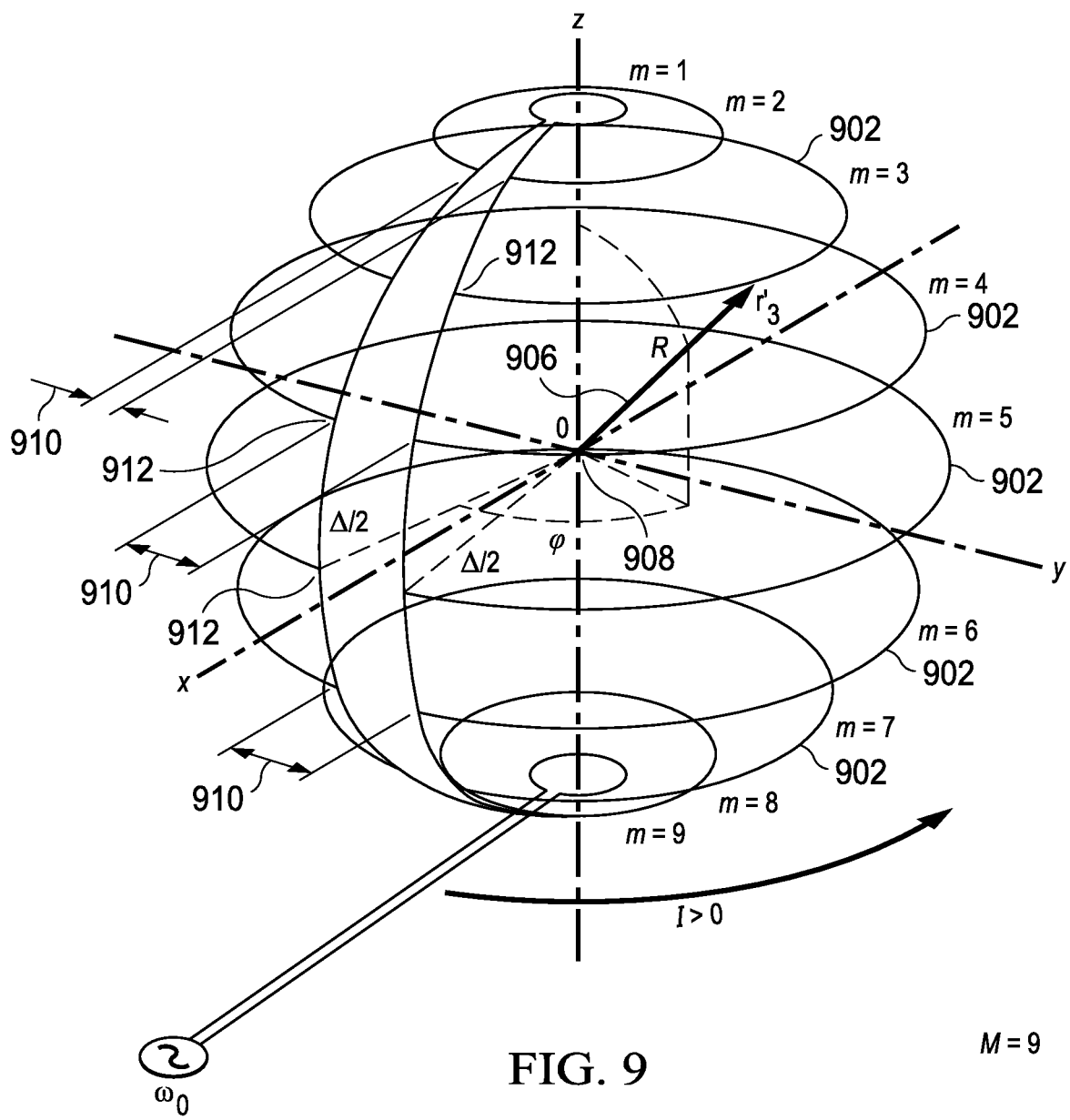
FIG. 9 illustrates electrically conducting rings for generation of electromagnetic radio wave knots.

Referring now to FIG. 8, there is illustrated a general illustration of the manner for generating electromagnetic radio wave knots and FIG. 9 that more fully illustrates the electrically conducting rings. Consider a collection of M electrically conducting rings 804, with each ring 902 concentric with the surface of a sphere 904 of radius R 906 centered at the origin 908. A section 910 of each ring with $\varphi\in(-\Delta/2, \Delta/2)$ removed. The ends 912 of each ring 902 connected to an alternating electric current source 802 of (central) angular frequency $\omega_0$; $\theta_m$ the polar angle of the mth ring ($m\in\{1, \ldots, M\}$) and $$I=\mathfrak{R}(\tilde{I}e^{-i\omega_0 t})$$

The (identical) current in each ring 902 is directed in the $\hat{\phi}$ direction for I>0. Ignoring interactions between rings 902, taking each ring to be of negligible cross-section, neglecting the radiation produced by the elements that connect the rings to the current source and assuming the surrounding medium to be transparent with phase refractive index $n_p$, the electric field radiated by the rings is essentially:

$$E^L = \mathfrak{R}(\tilde{E}^{LF}e^{-i\omega_0 t})$$

with each element treated as an oscillating electric dipole.

$$\tilde{E}^{LF} \approx \tilde{E}'_0\hat{\phi}f'e^{-i\omega_0 t}$$

$$\tilde{E}'_0 \frac{\mu_0\omega_0\tilde{I}Me^{ik_0 n_p R}}{2\pi}$$

$$f' = \int_0^\pi J_1(k_0\sin\vartheta n_p s)\cos(k_0\cos\vartheta n_p z)\sin\vartheta d\vartheta$$

$$E^{LF} \approx |\tilde{E}'_0|\hat{\phi}f'\cos(\omega_0 t - arg\tilde{E}'_0)$$

Which is essentially the electric field $E^a$ of the electric ring 802. The two coincide precisely in form for $n_p\approx 1$ so that f'=f, together with a choice of phase for I such that $\tilde{E}'_0 \rightarrow E_0$ is real. The geometrical requirements above are reasonably well satisfied by M=100, R=1.0×10$^{-1}$ m and $$\frac{\omega_0}{2\pi} = 1.3\times 10^{10} s^{-1},$$

for example. The design can be changes to generate other unusual electromagnetic disturbances in the radio waves.

Figure 10:
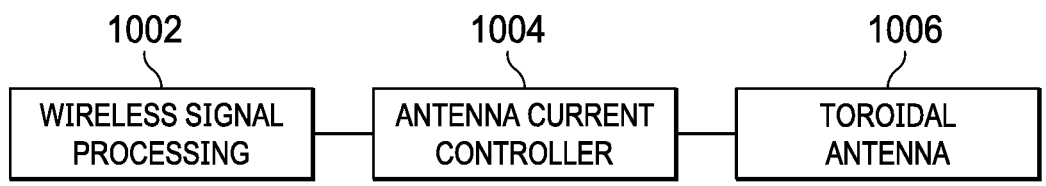
FIG. 10 illustrates a functional block diagram of a of a structure for generating wireless knots using a toroidal antenna.

Referring now to FIG. 10, there is provided a general block diagram of the structure for generating wireless electromagnetic knots using a toroidal antenna. The wireless signal processing circuitry 1002 generates wireless signals using RF or optical modulation. The wireless signals are provided to an antenna current controller 1004 that provides control currents to toroidal antennas 1006 such as those described herein below responsive to the generated wireless signals. By varying the applied currents from the current controller 1004 the electromagnetic knots may be applied to the wireless signals by the toroidal antennas 906.

Figure 11:
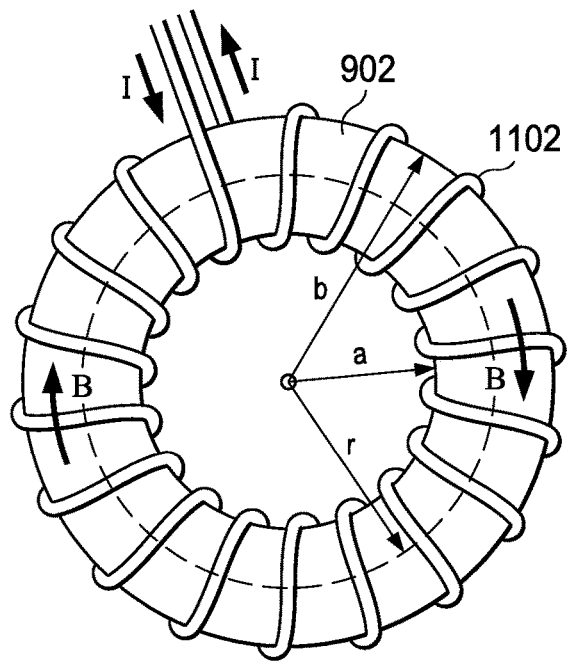
FIG. 11 illustrates a solenoid wrapped toroidal ring.
Figure 12:
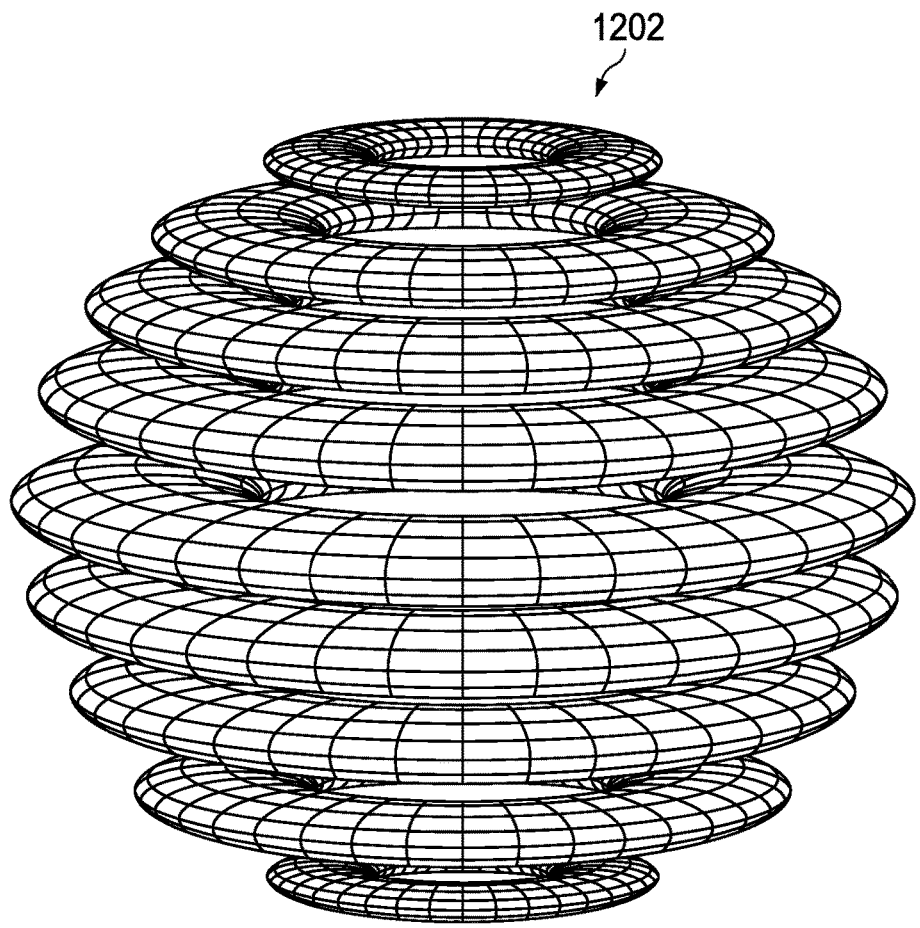
FIG. 12 illustrates a group of solenoid wrapped toroidal rings.

Referring not to FIG. 11, there is illustrated one of the rings 902 wrapped with a solenoid 1102. With respect to individual ring elements 902, a solenoid 1102 can be wrapped on the ring element 902 as shown in FIG. 11 and control the electromagnetic knots based on homotopy classes. Each of the rings 902 having the solenoid 1102 wrapped around it may be stacked on top of one another to form the sphere structure 1202 generally illustrated in FIG. 12.

Figure 13:
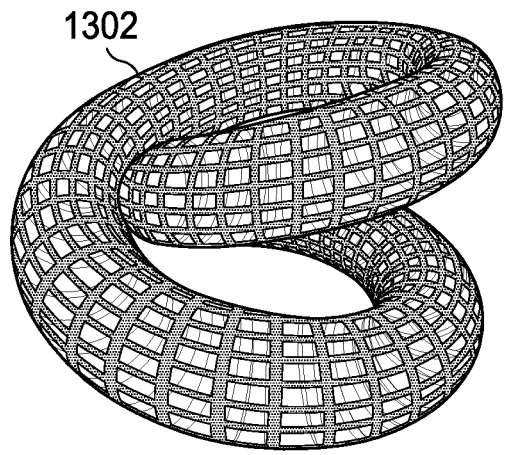
FIG. 13 illustrates a first sophisticated solenoid wrapped toroidal ring structure.
Figure 14:
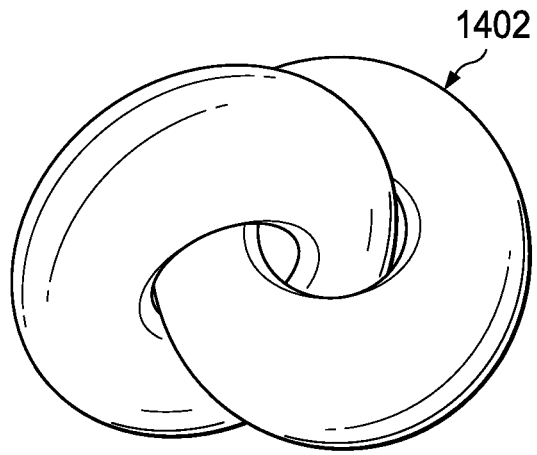
FIG. 14 illustrates a second sophisticated solenoid wrapped toroidal ring structure.

Referring now to FIGS. 13 and 14 there are illustrated more sophisticated structure antennas. The ring like structures 1302, 1402 illustrate knotted toroids that would also have solenoids wrapped around them in a similar manner to the rings.

Figure 15:
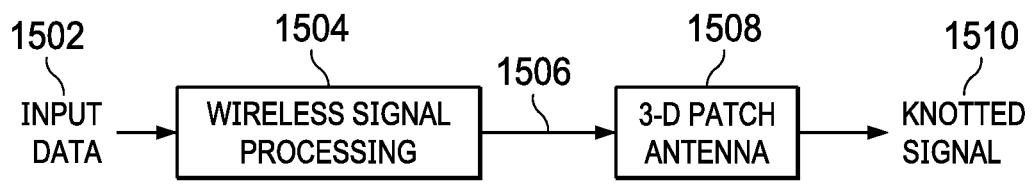
FIG. 15 illustrates the use of three-dimensional patch antennas for applying electromagnetic knots.

Referring now to FIG. 15 there is illustrated a further possible implementations for generating electromagnetic knots wherein three-dimensional patch antennas are used for applying the electromagnetic knots to a signal. The patch antennas may be similar to those described in U.S. patent applicaiton Ser. No. 16/037,550, issued on Jul. 17, 2018, entitled PATCH ANTENNA ARRAY FOR TRANSMISSION OF HERMITE-GAUSSIAN AND LAGUERRE GAUSSIAN BEAMS, which is incorporated herein by reference in its entirety. FIG. 15 illustrates a wireless signal transmission wherein input data 1502 is first applied to wireless signal processing circuitry 1504 that uses RF signal modulation techniques for modulating the input data 1502 on to an RF signal for transmission. The RF modulated signals 1306 from the wireless signal processing circuitry 1504 are applied to the three-dimensional patch antenna array 1508 for applying the electromagnetic knot to the RF signal to provide an output electromagnetic knotted signal 1510. Within the patch antenna array 1508, multiple patch antennas can be configured in circular, elliptical or mixed configuration to generate electromagnetic knots. Each component of the patch antenna array would have a different phase applied thereto to produce the knotted Eigen-channels. Additionally, multiple layers of antennas can be overlayed to naturally mux the independent modes using the electromagnetic knots. These structures are more fully described in FIGS. 16-21 below. Designs and simulations of the EM knots can be performed using ANSYS HFSS with micro-strip feed structure to prepare for manufacturing. Cleanroom and lithography process are used to build the 3D structure of patch antennas that produce EM knots.

Figure 16:
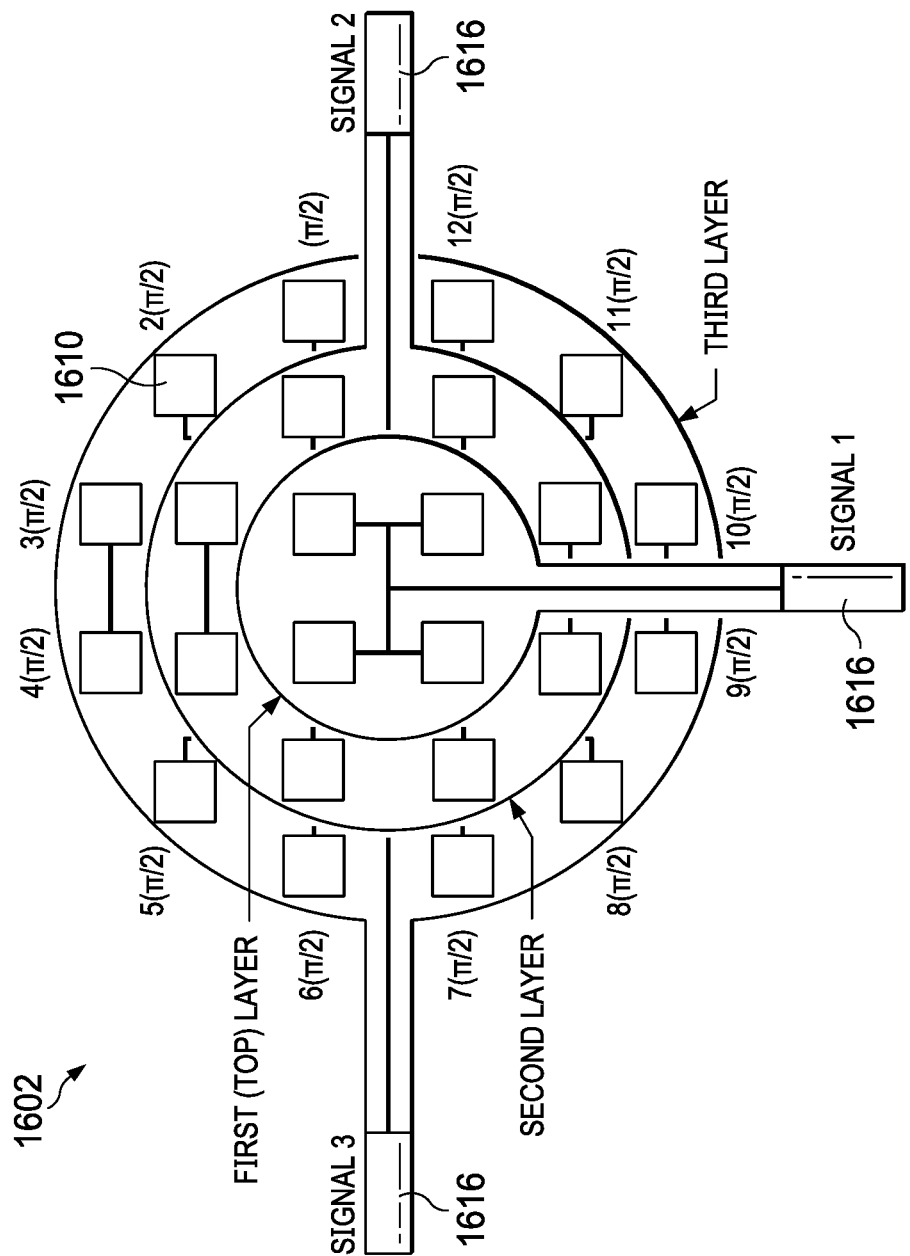
FIG. 16 illustrates a top view of a multilayer patch antenna array.

FIG. 16 illustrates a multilayer patch antenna array 1602 that may be electromagnetic knot transmissions. The multilayer patch antenna array 1602 includes a first antenna layer 1604 for transmitting a first ordered beam, a second antenna layer 1606 for transmitting a second ordered beam and a third layer 1608 for transmitting a third ordered beam. Each of the layers 1604, 1606 and 1608 are stacked on a same center. While the present embodiment is illustrated with respect to a multilayer patch antenna array 1602 including only three layers, it should be realized that either more or less layers may be implemented in a similar fashion as described herein. On the surface of each of the layers 1604, 1606 and 1608 are placed patch antennas 1610. Each of the patch antennas are placed such that they are not obscured by the above layer. The layers 1604, 1606 and 1608 are separated from each other by layer separator members 1612 that provide spacing between each of the layers 1604, 1606 and 1608. The configuration of the layers of the patch antenna may be in rectangular, circular or elliptical configurations to generate Hermite-Gaussian, Laguerre-Gaussian or Ince-Gaussian beams.

The patch antennas 1610 used within the multilayer patch antenna array 1602 are made from FR408 (flame retardant 408) laminate that is manufactured by Isola Global, of Chandler Ariz. and has a relative permittivity of approximately 3.75. The antenna has an overall height of 125 µm. The metal of the antenna is copper having a thickness of approximately 12 µm. The patch antenna is designed to have an operating frequency of 73 GHz and a free space wavelength of 4.1 mm. The dimensions of the input 50 Ohm line of the antenna is 280 µm while the input dimensions of the 100 Ohm line are 66 µm.

Figure 18:
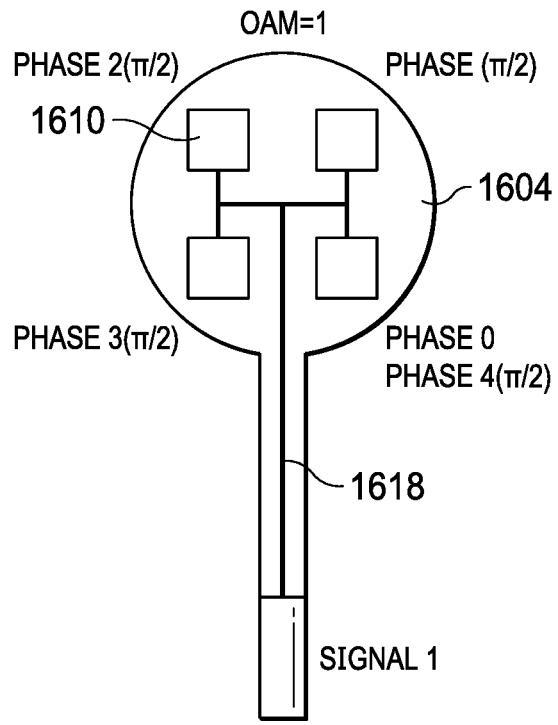
FIG. 18 illustrates a first layer of a multilayer patch antenna array.
Figure 19:
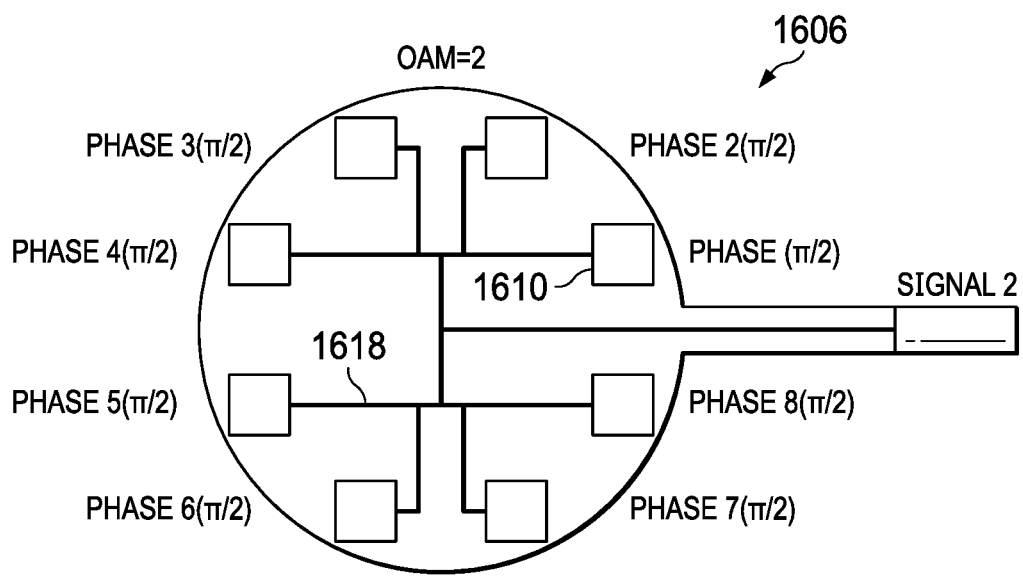
FIG. 19 illustrates a second layer of a multilayer patch antenna array.

Each of the patch antennas 1610 are configured to transmit signals at a predetermined phase that is different from the phase of each of the other patch antenna 1610 on a same layer. Thus, as further illustrated in FIG. 18, there are four patch antenna elements 1610 included on a layer 1604. Each of the antenna elements 1604 have a separate phase associated there with as indicated in FIG. 18. These phases include $\pi/2$, $2(\pi/2)$, $3(\pi/2)$ and $4(\pi/2)$. Similarly, as illustrated in FIG. 19 layer 1606 includes eight different patch antenna elements 1610 including the phases $\pi/2$, $2(\pi/2)$, $3(\pi/2)$, $4(\pi/2)$, $5(\pi/2)$, $6(\pi/2)$, $7(\pi/2)$ and $8(\pi/2)$ as indicated. Finally, referring back to FIG. 16, there are included 12 patch antenna elements 1610 on layer 1608. Each of these patch antenna elements 1610 have a phase assigned thereto in the manner indicated in FIG. 16. These phases include $\pi/2$, $2(\pi/2)$, $3(\pi2)$, $4(\pi/2)$, $5(\pi/2)$, $6(\pi/2)$, $7(\pi/2)$, $8(\pi/2)$, $9(\pi/2)$, $10(\pi/2)$, $11(\pi/2)$ and $12(\pi/2)$.

Figure 17:
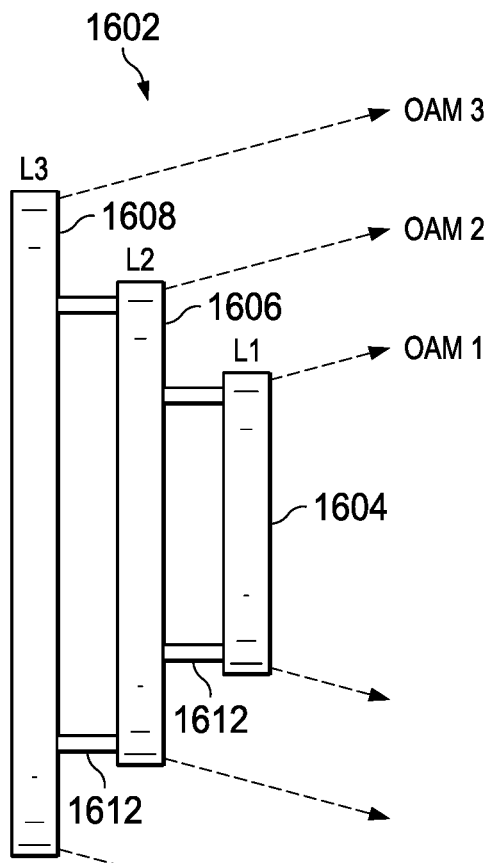
FIG. 17 illustrates a side view of a multilayer patch antenna array.

Each of the antenna layers 1604, 1606 and 1608 are connected to a coaxial end-launch connector 1616 to feed each layer of the multilayer patch antenna array 1602. Each of the connectors 1616 are connected to receive a separate signal that allows the transmission of a separate ordered antenna beam in a manner similar to that illustrated in FIG. 17. The emitted beams are multiplexed together by the multilayered patch antenna array 1602. The orthogonal wavefronts transmitted from each layer of the multilayered patch antenna array 1602 in a spatial manner to increase capacity as each wavefront will act as an independent Eigen channel. The signals are multiplexed onto a single frequency and propagate without interference or crosstalk between the multiplexed signals. While the illustration with respect to FIG. 17 illustrates the transmission of OAM beams at OAM 1, OAM 2 and OAM 3 ordered levels.

It should be understood that other types of Hermite Gaussian and Laguerre Gaussian beams can be transmitted using the multilayer patch antenna array 1602 illustrated. Hermite-Gaussian polynomials and Laguerre-Gaussian polynomials are examples of classical orthogonal polynomial sequences, which are the Eigenstates of a quantum harmonic oscillator. However, it should be understood that other signals may also be used, for example orthogonal polynomials or functions such as Jacobi polynomials, Gegenbauer polynomials, Legendre polynomials and Chebyshev polynomials. Legendre functions, Bessel functions, prolate spheroidal functions and Ince-Gaussian functions may also be used. Q-functions are another class of functions that can be employed as a basis for orthogonal functions.

The feeding network 1618 illustrated on each of the layers 1604, 1606, 1608 uses delay lines of differing lengths in order to establish the phase of each patch antenna element 1610. By configuring the phases as illustrated in FIGS. 16-18 the OAM beams of different orders are generated and multiplexed together.

Figure 20:
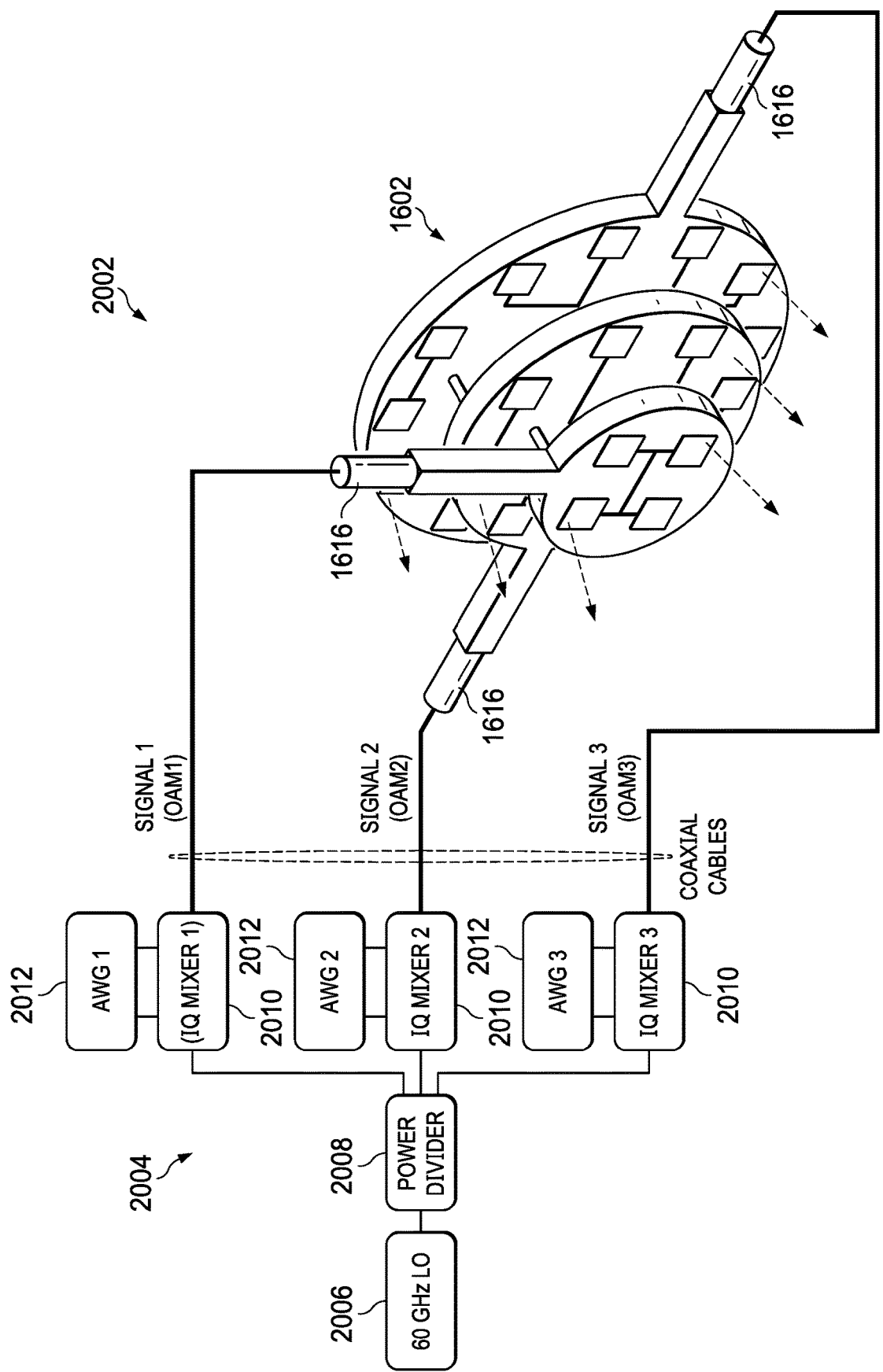
FIG. 20 illustrates a transmitter for use with a multilayer patch antenna array.

Referring now to FIG. 20, there is illustrated a transmitter 2002 for generating a multiplexed beam for transmission. As discussed previously, the multilayered patch antenna array 1602 includes a connector 1616 associated with each layer 1604, 1606, 1608 of the multilayer patch antenna array 1602. Each of these connectors 1616 are connected with signal generation circuitry 2004. The signal generation circuitry 2004 includes, in one embodiment, a 60 GHz local oscillator 2006 for generating a 60 GHz carrier signal. The signal generation circuit 2004 may also work with other frequencies, such as 70/80 GHz. The 60 GHz signal is output from the local oscillator 2006 to a power divider circuit 2008 which separates the 60 GHz signal into three separate transmission signals. Each of these separated transmission signals are provided to an IQ mixer 2010 that are each connected to one of the layer input connectors 1616. The IQ mixer circuits 2010 are connected to an associated additive white Gaussian noise circuit 2012 for inserting a noise element into the generated transmission signal. The AWG circuit 2012 may also generate SuperQAM signals for insertion in to the transmission signals. The IQ mixer 2010 generates signals in a manner such as that described in U.S. Pat. No. 9,331,875, issued on May 3, 2016, entitled SYSTEM AND METHOD FOR COMMUNICATION USING ORBITAL ANGULAR MOMENTUM WITH MULTIPLE LAYER OVERLAY MODULATION, which is incorporated herein by reference in its entirety.

Figure 21:
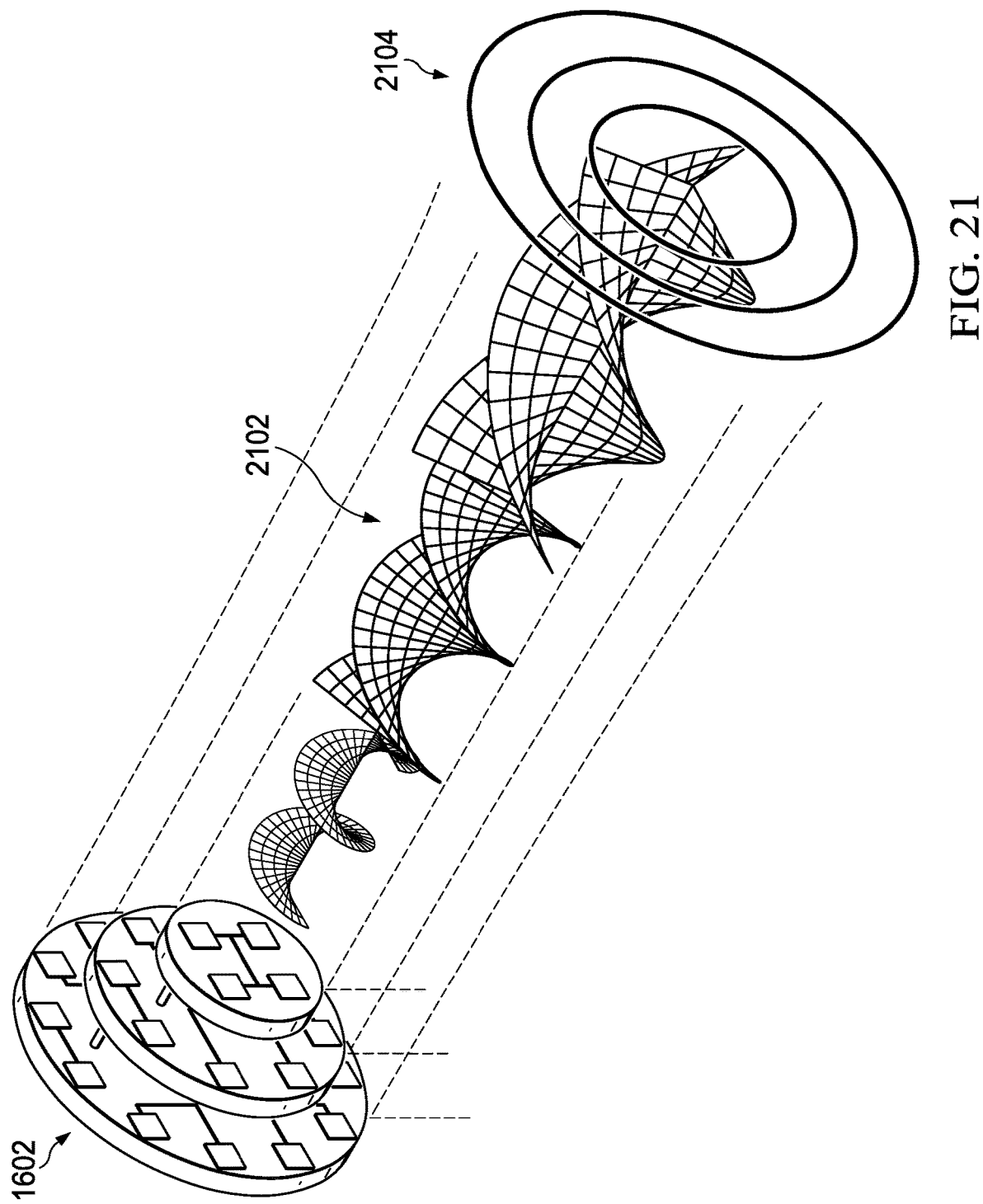
FIG. 21 illustrates a multiplexed OAM signal transmitted from a multilayer patch antenna array.

Using the transmitter 2002 illustrated in FIG. 20. A multiplexed beam (Hermite Gaussian, Laguerre Gaussian, etc.) can be generated as illustrated in FIG. 21. As illustrated, the multilayered patch antenna array 1602 will generate a multiplexed beam 2102 for transmission. In the present example, there is illustrated a multiplex OAM beam that has twists for various order OAM signals in a manner similar to that disclosed in U.S. Pat. No. 9,331,875. An associated receiver detector would detect the various OAM rings 604 as illustrated each of the rings associated with a separate OAM processed signal.

Figure 22:
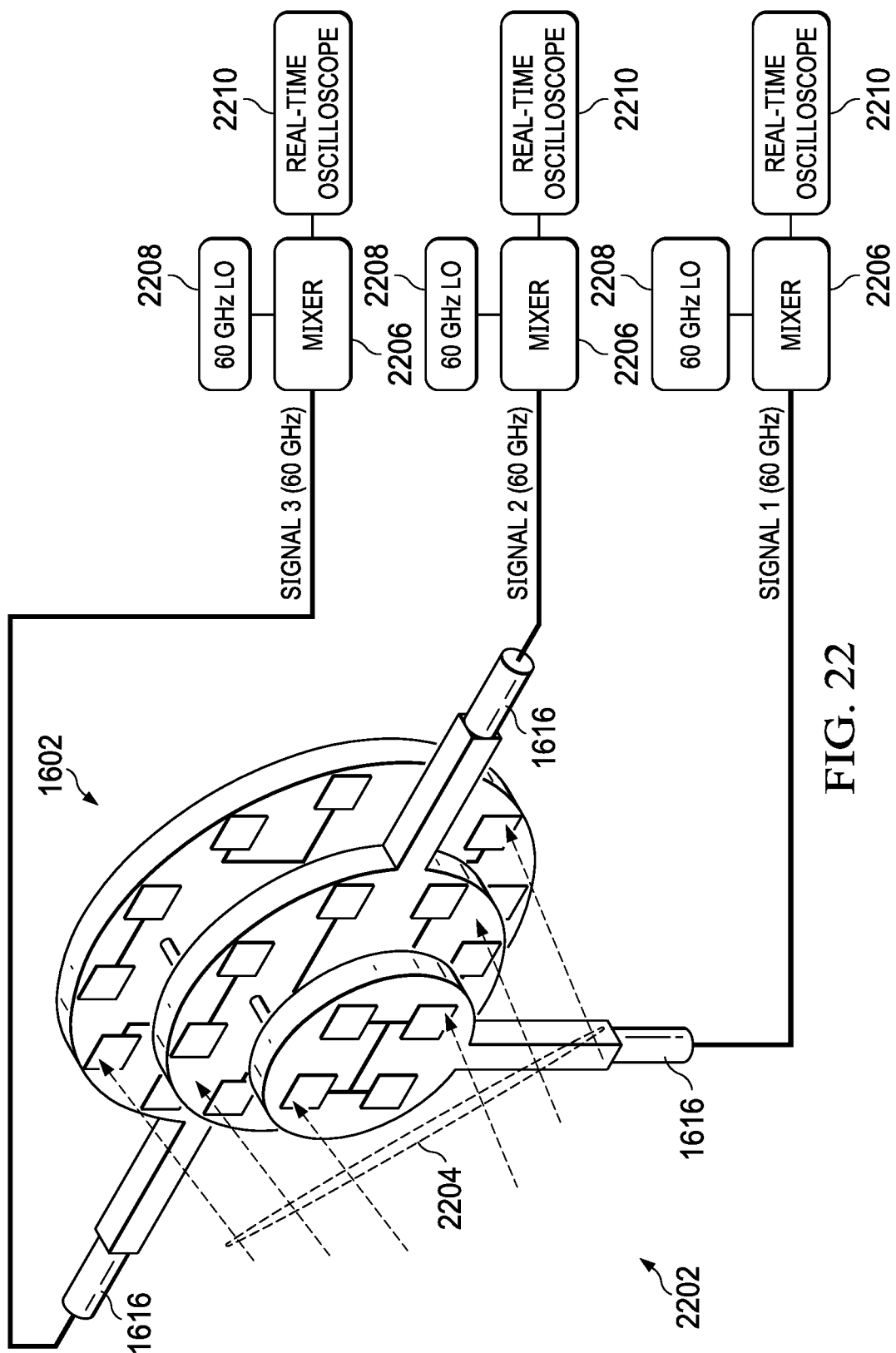
FIG. 22 illustrates a receiver for use with a multilayer patch antenna array.

Referring now to FIG. 22, there is illustrated a receiver 2202 for demultiplexing signals received from a multiplexed signal generated using the transmitter 2002 of FIG. 20. The receiver 2202 includes a multilayer patch antenna array 1602 such as that described herein above. The multilayer patch antenna array 1602 receives the incoming multiplexed signal 2204 and each layer 1604, 1606, and 1608 of the antenna array 1602 will extract a particular order of the received multiplexed signal from each of the connector outputs 1616 of a particular layer. The signals from each of the connectors 1616 are applied to a mixer circuit 2206 that demultiplexes the received signal in a manner similar to that discussed with respect to U.S. patent application Ser. No. 14/323,082 using a 60 GHz local oscillator signal from oscillator 2208. The demultiplexed signal may then be read using, for example, a real-time oscilloscope 2210 or other signal reading device. Each of the three transmitted signals is thus decoded at the receiver 2202 that were transmitted in each of the ordered OAM signals received from the transmitters 2102. In a further embodiment, a demultiplexing approach using SPP (spiral phase plate) may also be applied to detect OAM channels.

The signals transmitted by the transmitter 2002 or the receiver 2202 may be used for the transmission of information between two locations in a variety of matters. These include there use in both front haul communications and back haul communications within a telecommunications or data network.

As described previously, the knotted signals 1510 (FIG. 15) within the wireless signal transmission system will be less susceptible to fading and geometrical dispersion due to the application of the electromagnetic knots to the signals for transmission. The patch antenna array and design may in one embodiment comprises the patch antenna arrays described in U.S. patent application Ser. No. 15/960,904, entitled SYSTEM AND METHOD FOR COMBINING MIMO AND MODE-DIVISION MULTIPLEXING, filed on Apr. 24, 2018, which is incorporated herein by reference in its entirety.

In addition to the RF wireless versions described above other types of system may be used for generating electromagnetic knots in other operating environments. Qubit signals in quantum computing system can be generated using electromagnetic knots in photonics using polarization states of the signals in system such as those described in U.S. patent application Ser. No. 16/509,301, entitled UNIVERSAL QUANTUM COMPUTER, COMMUNICATION, QKD SECURITY AND QUANTUM NETWORKS USING OAM QU-DITS WITH DLP, filed on Jul. 11, 2019, which is incorporated herein by reference in its entirety. Knotted OAM states can be generated using both photonics and electromagnetic waves such as those described in U.S. patent application Ser. No. 14/882,085, entitled APPLICATION OF ORBITAL ANGULAR MOMENTUM TO FIBER, FSO AND RF, filed on Oct. 13, 2015, which is incorporated herein by reference in its entirety.

Referring now to FIGS. 23-25 there are illustrated a number of other implementations of the knotted signal processing. FIG. 23 illustrates a system wherein multiple signals are input to OAM processing circuitry 2302 that applies an orbital angular momentum to the signals. The OAM processed signals are applied to knotted processing circuitry 2304 that applies electromagnetic knots to the OAM signals using one of the techniques described herein. Each of the knotted beams may carry a different message signal. The knotted OAM processed signals may be muxed together using multiplexing circuitry 2306. The multiplexing circuitry may mux the signals by the multiplexing circuitry 2306 at a specific radio frequency. The multiplexed knotted OAM circuitry may be transmitted from a transmitter to a receiver, and the signal is demultiplexed into the knotted OAM processed signals using demultiplexing circuitry 2308. The demultiplexed signals are applied to the knotted processing circuitry 2310 to remove the previously applied electromagnetic knots from the signal. The de-knotted signals are finally applied to the OAM processing circuitry 2312 to remove the orbital angular momentum from each of the signals.

FIG. 24 illustrates how OAM knotted beams 2402 or muxed OAM knotted beams each carrying different signals may be multiplexed with different radio channels 2404 by multiplexing circuitry 2406 for transmission.

FIG. 25 illustrates knot division multiplexing circuitry 2502 for receiving multiple input signals 2504 to generate a knotted multiplexed output 2506. The knot division multiplexing (KDM) can combine the signals on a single frequency. KDM may be applied in both Backhaul and Fronthaul scenarios to improve their operation. The KDM processed signals may further be transmitted using MIMO techniques in a compactified massive MIMO system such as that disclosed in U.S. patent application Ser. No. 15/960,904, entitled SYSTEM AND METHOD FOR COMBINING MIMO AND MODE-DIVISION MULTIPLEXING, filed on Apr. 24, 2018, which is incorporated herein by reference in its entirety.

As described above path loss can degrade an electromagnetic signal. Other than path loss degradation of electromagnetic signals (due to geometrical dispersion), channel effects can also degrade the information signal (channel conditions). As discussed herein, environmental degradations can never open the electromagnetic knots. The electromagnetic knots may be used in a number of applications including all communications in wireless and fiber, radar, wearable using lasers and biomedical devices.

In topological quantum computers, the Schrodinger wave function or state is knotted via a sophisticated braiding process that preserves the topological features (wave knots) in the presence of noise (critical for quantum computing). Therefore, one has to encode information into the electromagnetic knots before transmission. Various applications of wave function knots include quantum computing, quantum communications and networks, quantum informatics, cyber security and condensed matter or solid states.

The mathematical foundation of the above is a new algebra (Clifford Algebra) which generalizes quaternions and its relationship with electromagnetic knots as well as braid group representations related to Majorana fermions. This algebra is a non-Abelian algebra where such knots can be generated. These braiding representations have important applications in quantum informatics and topology. There is one algebra describing both electromagnetic knots as well as Majorana operators. They are intimately connected to SU(2) symmetry groups in group theory. A new formulation of electromagnetism in SU(2) symmetry can describe over half a dozen observed electromagnetic phenomenon where traditional theory in U(1) symmetry cannot. That is the braiding of Majorana fermions as well as electromagnetic knots happen by natural representations of Clifford algebras and also with the representations of the quaternions as SU(2) to the braid group and electromagnetic knots.

It will be appreciated by those skilled in the art having the benefit of this disclosure that this electromagnetic knots and its applications in radio waves for wireless transmissions and photonics for quantum computing provides an improved manner for limiting signal degradation to signals in wireless systems and quantum computing. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for transmitting signals, comprising:
processing circuitry for receiving at least one input signal for transmission from the processing circuitry to a second location;
electromagnetic knot processing circuitry for receiving processed signals from the processing circuitry for applying an electromagnetic knot to the received processed signal before transmission to the second location; and
wherein a first signal degradation caused by environmental factors of the electromagnetic knot processed signal is improved over a second signal degradation caused by the environmental factors of a signal not including the electromagnetic knot, wherein the first and second signal degradation comprises signal de-coherence.

2. The system of claim 1, wherein the processing circuitry comprises wireless signal modulation circuitry for modulating the at least one input signal for transmission from the wireless signal modulation circuitry to the second location.

3. The system of claim 2, wherein the first and second signal degradation comprises at least one of signal fading and geometrical dispersion.

4. The system of claim 1, wherein the processing circuitry comprises optical signal modulation circuitry for modulating the at least one input signal for transmission from the optical signal modulation circuitry to the second location.

5. The system of claim 1, wherein the processing circuitry comprises a quantum computing circuit for generating a quantum signal responsive to the at least one input signal for transmission from the quantum computing circuit to the second location.

6. The system of claim 1, wherein the electromagnetic knot processing circuitry further comprises:
a plurality of toroidal antennas connected to receive the processed signal from the processing circuitry, wherein the plurality of toroidal antennas apply the electromagnetic knot to the at least one input sign to generate the electromagnetic knot processed signal responsive to a current control signal; and
an antenna current controller for generating the current control signal to control the application of the electromagnetic knot to the electromagnetic knot processed signal.

7. The system of claim 6, wherein the plurality of toroidal antennas comprise a plurality of rings each ring having a solenoid wrapped around the ring, the plurality of rings stacked on top of one another to provide a substantially sphere shape.

8. The system of claim 1, wherein the electromagnetic knot processing circuitry further comprise:
a knotted toroid; and
a solenoid wrapped around the knotted toroid.

9. The system of claim 1, wherein the electromagnetic knot processing circuitry further comprises a three dimensional patch antenna array for applying the electromagnetic knot to the received processed signal.

10. The system of claim 9, wherein the three dimensional patch antenna array further comprises:
a plurality of patch antennas;
a plurality of layers, each of the plurality of layers separated from each other by a distance, each of the plurality of layers further supporting a portion of the plurality of patch antennas;
a plurality of connectors, each of the plurality of connectors associated with one of the plurality of layers, for supplying a signal for transmission by the associated layer; and
a feed network on each of the plurality of layers for providing a connection between a connector of the plurality of connectors associated with the layer and the portion of the plurality of patch antennas located on the layer, wherein a length of the connection between the connector and each of the portion of the plurality of patch antennas applies a different phase to each of the portion of the plurality of patch antennas on the layer.

11. The system of claim 1 further comprising orbital angular momentum processing circuitry for applying an orbital angular momentum to the at least one input signal.

12. The system of claim 1, wherein the processing circuitry comprises at least one of RF processing circuitry and photonic processing circuitry.

13. A method for transmitting signals, comprising:
receiving at least one input signal for transmission from a processing circuitry to a second location;

applying an electromagnetic knot to the received processed signal before transmission to the second location using electromagnetic knot processing circuitry; and wherein a first signal degradation caused by environmental factors of the electromagnetic knot processed signal is improved over a second signal degradation caused by the environmental factors of a signal not including the electromagnetic knot, wherein the first and second signal degradation comprises signal de-coherence.

14. The method of claim 13 modulating the at least one input signal for transmission from the processing circuitry to the second location using signal modulation circuitry.

15. The method of claim 14, wherein the first and second signal degradation comprises at least one of signal fading and geometrical dispersion.

16. The method of claim 13 modulating the at least one input signal for transmission to the second location using optical signal modulation circuitry.

17. The method of claim 13 generating a quantum signal responsive to the at least one input signal for transmission from a quantum computing circuit to the second location.

18. The method of claim 13, wherein the step of applying further comprises:
applying the electromagnetic knot to the at least one input sign to generate the electromagnetic knot processed signal responsive to a current control signal provided to a plurality of toroidal antennas; and
generating the current control signal to control the application of the electromagnetic knot to the electromagnetic knot processed signal using an antenna current controller.

19. The method of claim 18, wherein the plurality of toroidal antennas comprise a plurality of rings each ring having a solenoid wrapped around the ring, the plurality of rings stacked on top of one another to provide a substantially sphere shape.

20. The method of claim 13, wherein the step of applying further comprises applying the electromagnetic knot to the at least one input sign to generate the electromagnetic knot processed signal using a solenoid wrapped knotted toroid.

21. The method of claim 13, wherein the step of applying further comprises applying the electromagnetic knot to the at least one input sign to generate the electromagnetic knot processed signal using a three dimensional patch antenna array.

22. The method of claim 13 further comprising applying an orbital angular momentum to the at least one input signal using orbital angular momentum processing circuitry.

23. The method of claim 13, wherein the at least one input signal comprises at least one of an RF signal and a photonic signal.

24. A system for transmitting signals, comprising:
wireless signal modulation circuitry for receiving at least one input signal and modulating the at least one input signal for transmission from the wireless signal modulation circuitry to a second location;
electromagnetic knot processing circuitry for receiving processed signals from the wireless signal modulation circuitry for applying an electromagnetic knot to the received processed signal before transmission to the second location, wherein the electromagnetic knot processing circuitry further comprises:
a plurality of toroidal antennas connected to receive the processed signal from the wireless signal modulation circuitry, wherein the plurality of toroidal antennas apply the electromagnetic knot to the at least one input signal to generate the electromagnetic knot processed signal responsive to a current control signal;
an antenna current controller for generating the current control signal to control the application of the electromagnetic knot to the electromagnetic knot processed signal; and
wherein a first signal degradation caused by environmental factors of the electromagnetic knot processed signal is improved over a second signal degradation caused by the environmental factors of a signal not including the electromagnetic knot.

25. The system of claim 24, wherein the first and second signal degradation comprises at least one of signal fading and geometrical dispersion.

26. The system of claim 24, wherein the plurality of toroidal antennas comprise a plurality of rings each ring having a solenoid wrapped around the ring, the plurality of rings stacked on top of one another to provide a substantially sphere shaped antenna.

27. A system for transmitting signals, comprising:
wireless signal modulation circuitry for receiving at least one input signal and modulating the at least one input signal for transmission from the wireless signal modulation circuitry to a second location;
electromagnetic knot processing circuitry for receiving processed signals from the wireless signal modulation circuitry for applying an electromagnetic knot to the received processed signal before transmission to the second location, wherein the electromagnetic knot processing circuitry further comprises a three dimensional patch antenna array for applying the electromagnetic knot to the received processed signal comprising:
a plurality of patch antennas;
a plurality of layers, each of the plurality of layers separated from each other by a distance, each of the plurality of layers further supporting a portion of the plurality of patch antennas;
a plurality of connectors, each of the plurality of connectors associated with one of the plurality of layers, for supplying a signal for transmission by the associated layer;
a feed network on each of the plurality of layers for providing a connection between a connector of the plurality of connectors associated with the layer and the portion of the plurality of patch antennas located on the layer, wherein a length of the connection between the connector and each of the portion of the plurality of patch antennas applies a different phase to each of the portion of the plurality of patch antennas on the layer; and
wherein a first signal degradation caused by environmental factors of the electromagnetic knot processed signal is improved over a second signal degradation caused by the environmental factors of a signal not including the electromagnetic knot.

28. The system of claim 27, wherein the first and second signal degradation comprises at least one of signal fading and geometrical dispersion.

29. A system for transmitting signals, comprising:
processing circuitry for receiving at least one input signal for transmission from the processing circuitry to a second location;
electromagnetic knot processing circuitry for receiving processed signals from the processing circuitry for applying an electromagnetic knot to the received processed signal before transmission to the second location, wherein the electromagnetic knot processing circuitry further comprises:
a knotted toroid;
a solenoid wrapped around the knotted toroid; and
wherein a first signal degradation caused by environmental factors of the electromagnetic knot processed signal is improved over a second signal degradation caused by the environmental factors of a signal not including an electromagnetic knot.

30. A system for transmitting signals, comprising:
processing circuitry for receiving at least one input signal for transmission from the processing circuitry to a second location, wherein the processing circuitry comprises a quantum computing circuit for generating a quantum signal responsive to the at least one input signal for transmission from the quantum computing circuit to the second location;
electromagnetic knot processing circuitry for receiving processed signals from the processing circuitry for applying an electromagnetic knot to the received processed signal before transmission to the second location; and
wherein a first signal degradation caused by environmental factors of the electromagnetic knot processed signal is improved over a second signal degradation caused by the environmental factors of a signal not including an electromagnetic knot.

31. The system of claim 30, wherein the quantum computing circuit generates topological features that limits effects of the environmental factors.

\* \* \* \* \*